Dec. 2, 1924.
C. G. VON POST
CASING FOR WEIGHING MECHANISMS
Filed Sept. 28, 1921
1,517,658
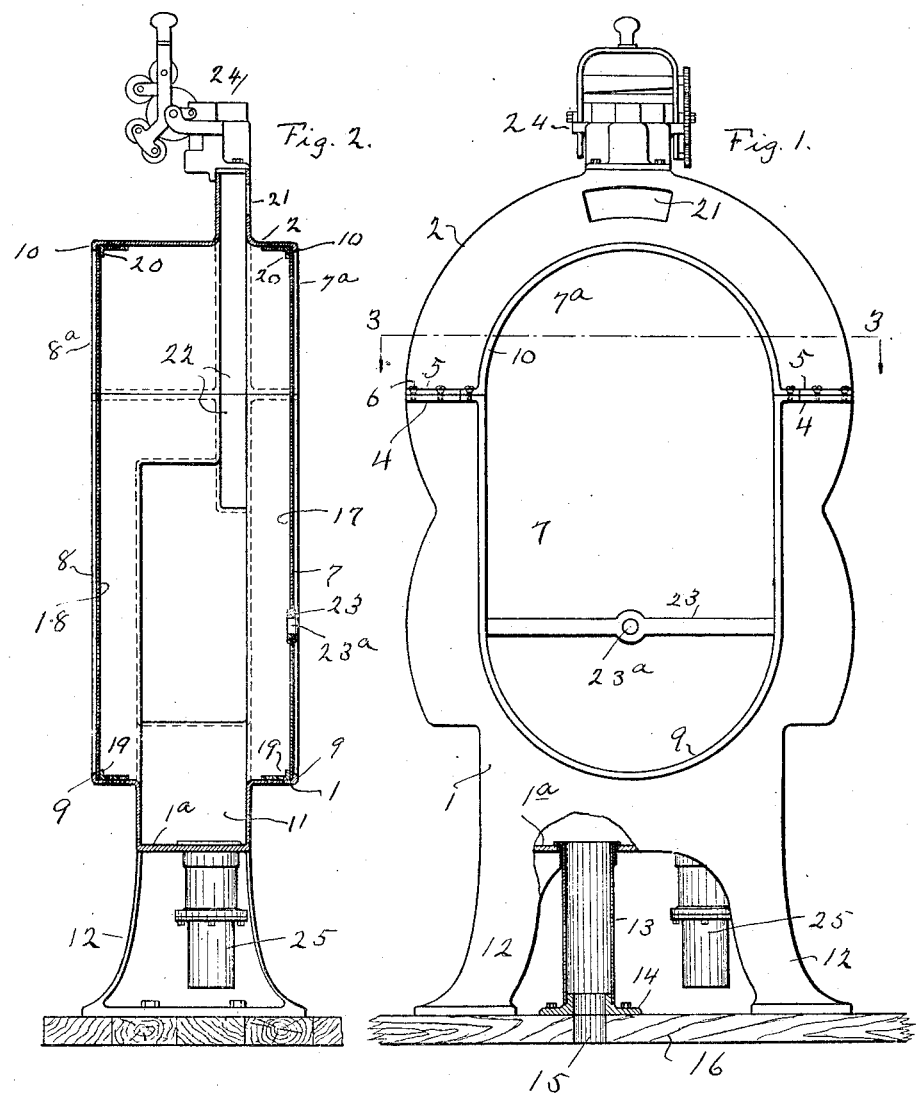
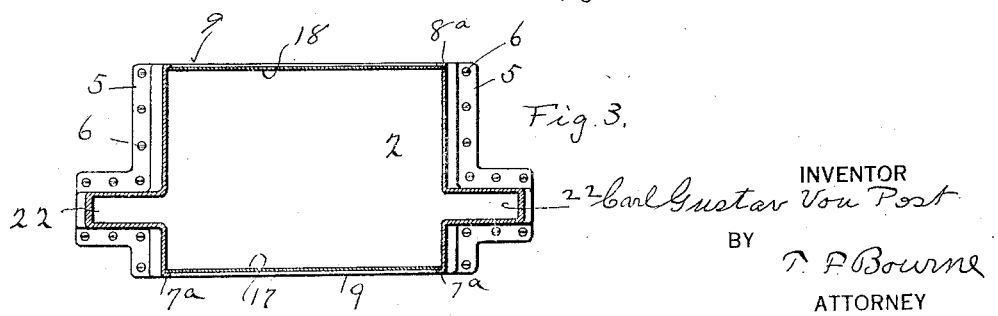
INVENTOR
Carl Gustav Von Post
BY
T. F. Bourne
ATTORNEY Patented Dec. 2, 1924.

1,517,658

UNITED STATES PATENT OFFICE.

CARL GUSTAV von POST, OF STOCKHOLM, SWEDEN; ANNA von POST, EXECUTRIX OF SAID CARL GUSTAV von POST, DECEASED, ASSIGNOR TO AKTIEBOLAGET ORIGINAL-ODHNER, OF GOTTENBORG, SWEDEN, A CORPORATION OF SWEDEN.

CASING FOR WEIGHING MECHANISMS.

Application filed September 28, 1921. Serial No. 503,950.

*To all whom it may concern:*

Be it known that I, CARL GUSTAV VON POST, a subject of the King of Sweden, and resident of Stockholm, Sweden, have invented certain new and useful Improvements in Casings for Weighing Mechanisms, of which the following is a specification.

The object of my invention is to provide a simple and effectual casing wherein weighing mechanisms may be placed to protect the same from dust and weather conditions, which casing may have its parts readily separated for the purpose of access to the weighing mechanism therein.

In carrying out my invention I provide a casing having two main members detachably connected together with front and back plates secured within the casing and held therein by the cooperation of the two main parts of the casing.

My invention comprises novel details of improvement that will be more fully hereinafter set forth and then pointed out in the claims.

Reference is to be had to the accompanying drawings forming part hereof, wherein—

Figure 1 is a partly sectional front view of a casing for a weighing mechanism embodying my invention; Fig. 2 is a vertical section of Fig. 1, and Fig. 3 is a cross section on line 3, 3, in Fig. 1.

Similar numerals of reference indicate corresponding parts in the several views.

The lower hollow member of the casing is indicated at 1 and the upper hollow member of the casing is indicated at 2, said casing members being opposed and respectively provided with flanges 4, 5, adapted to be secured together by screws 6. The lower casing member 1 and the upper casing member 2 have corresponding front and rear opening 7, 7ª and 8, 8ª that register, around the margins of which openings are inturned flanges 9, 10. The casing members 1, 2, are shown in hollow form and may be made of sheet metal or cast, the member being shown provided with the depressed chamber 11 and legs 12. From the bottom wall 1ª of member 1 a tube 13 depends to receive a draft rod of a scale platform or pan. The tube 13 communicates through hollow base or casting 14 with aperture 15 in base 16 on which casing legs 12 are secured. The upper end of tube 13 is shown flanged over bottom wall 1ª and the base 14 receives said tube, whereby the latter is retained in place.

Front and rear walls 17 and 18, preferably of sheet metal, fit at their edges within and against the casing members 1 and 2 and between the flanges 9, 10 thereof and flanges 19, 20 secured within the members 1 and 2. Said flanges detachably retain the wall 17 and 18 when the members 1 and 2 are secured together as illustrated. The upper front portion of casing member 2 is provided with an opening 21 through which may be seen an indicator, such as a rotative dial or pointer, of a scale mechanism within the casing. The side walls of members 1 and 2 are shown provided with vertically disposed and outwardly extending chambers to receive parts of the scale mechanism. The front wall 17 is shown provided with a cross bar 23 having upper and lower longitudinal grooves receiving the edges of the metal sheets comprised in the front wall. Said bar is shown provided with a hole 23ª to which parts of the scale mechanism within the casing may be attached. The bar 23 reinforces and strengthens the front wall 17. A recording mechanism for the scale is indicated, generally, at 24 secured at the top of member 2 and may be removed with the latter from member 1. A dash-pot 25 is shown depending below wall 1ª from which the dash-pot hangs. The dash-pot being placed so that it can be handled from outside and provided with a tube enclosing the suspending rod for operating the pump-box and connected to the wall 1ª and the hold of the dash-pot as above described for the tube 13. Thus the opening in the casing for the rod being closed.

When the scale mechanism is to be installed within the casing the upper member 2 is lifted from member 1 and one or both walls 17, 18 may be removed. After the scale mechanism has been set within member 1 the wall or walls 17, 18 will be inserted in said member and member 2 will be applied over member 1 and said walls, said members being secured together by screws 6.

My improvement provides a simple and relatively cheap casing for the purpose intended, wherein a scale mechanism may be secured in a substantially dust-proof way, and access to said mechanism may be readily had by merely removing member 2 and one or both of the walls 17, 18.

Having now described my invention what I claim is:—

1. A casing comprising opposing U-shaped members provided with legs registering with one another at the extremity, walls fitted to said members at the openings formed thereby at either side, means to retain said walls upon said members, and means to secure said members together.

2. A casing comprising opposing U-shaped members provided with legs registering with one another at the extremity, walls fitted to said members at the openings formed thereby at either side, said members having flanges to retain said walls, and means to secure said members together.

3. A casing comprising opposing U-shaped members provided with legs registering with one another at the extremity, walls fitted to said members at the openings formed thereby at either side, means to retain said walls upon said members, and means to secure said members together, one of said walls comprising a plurality of sheets and a cross bar having grooves receiving said sheets.

4. A casing comprising opposing upper and lower U-shaped members, the upper member having vertically disposed outwardly extending members, said first named members having registering opposing openings, walls fitted to said members at the openings formed thereby at either side, means to retain said walls upon said members, and means to detachably secure said members together.

Signed at Gottenborg, in the county of Gottenborg and Bohus and State of Sweden, this 9th day of September A. D. 1921.

CARL GUSTAV von POST.